June 7, 1949.  A. T. GREGORY  2,472,418
ENGINE COOLING BAFFLE
Original Filed Dec. 7, 1943  2 Sheets-Sheet 1
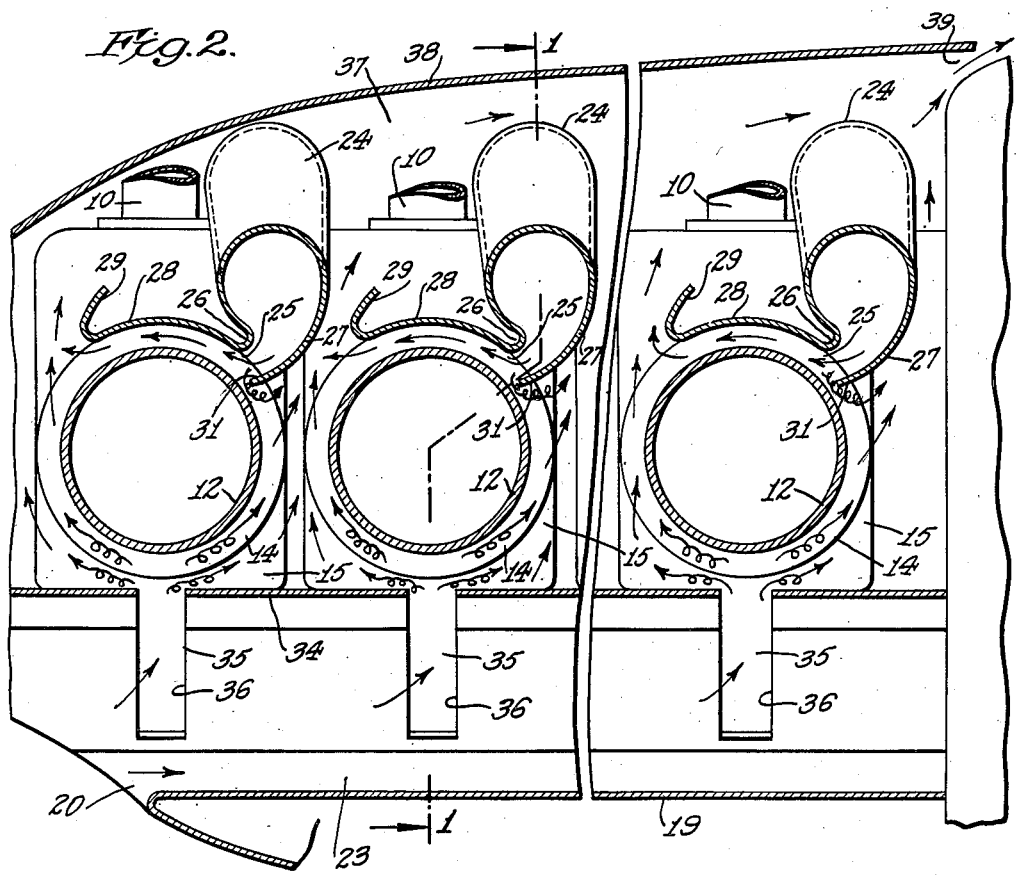
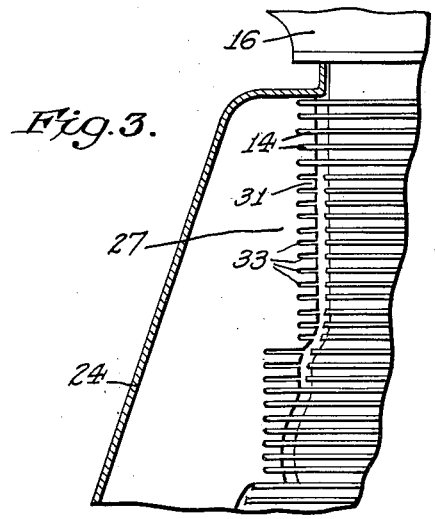
INVENTOR:
ALFRED T. GREGORY
BY
*Hogert, Heavy Campbell*
ATTORNEYS Patented June 7, 1949

2,472,418

UNITED STATES PATENT OFFICE 2,472,418

ENGINE COOLING BAFFLE

Alfred T. Gregory, Massapequa, N. Y., assignor to Fairchild Engine and Airplane Corporation, Farmingdale, N. Y., a corporation of Maryland Original application December 7, 1943, Serial No. 513,211. Divided and this application January 29, 1945, Serial No. 575,083

8 Claims. (Cl. 123—171)

This invention relates to baffles for internal combustion engine cooling systems, of the general type described and claimed in my application Serial No. 513,211, filed December 7, 1943, now abandoned, of which this application is a division.

In accordance with the present invention, the differential air pressure cooling system described in said application, as adapted for aeronautical engines, comprises a main static pressure cooling air scoop, supplemented with a conduit system, or two air scoops and corresponding conduit systems, whereby large volumes of cooling air are directed on opposite sides of the finned cylinders of a row or bank, under such conditions that the system is bipolar in operation. The air outlets from such bipolar conduits or passages aggregate a smaller area than the area of the scoop air intake opening or openings, or, alternatively, a restriction to air flow as by friction is created, so that a substantial pressure builds up within the scoop, owing to the kinetic energy of the inflowing air, and hence the cooling air that is bipolarly directed by the system over the selected areas of the cylinder surfaces flows at substantial volume, pressure and velocity.

In addition to selected areas of the cylinders that are cooled by the large volumes of cooling air conducted thereto by the bipolar system, certain more localized areas thereof require special cooling by reason of hot spots, piston thrust frictional heat, and the like, and it is the principal object of the present invention to provide baffle means at such localized areas to effect special cooling thereof.

In accordance with the present invention, a sharp-edged baffle is inserted part way into the cooling fins of the cylinder so as to partially intercept the cooling air stream such as that issuing from one of the bipolar ducts, thereby creating turbulence in the stream as it flows over the sharp edge of the baffle. The baffle is so placed that the turbulence is created at the local area requiring special cooling, so that the turbulent air scours the adjacent cylinder wall and fins to thereby remove the heat and also the skin of spent cooling air that tends to adhere to these areas.

Fig. 2 is a horizontal section therethrough as seen along the line 2—2 of Fig. 1, only three cylinders being shown; and Fig. 3 shows another manner in which the local turbulence-creating baffle may be made.

Figure 1:
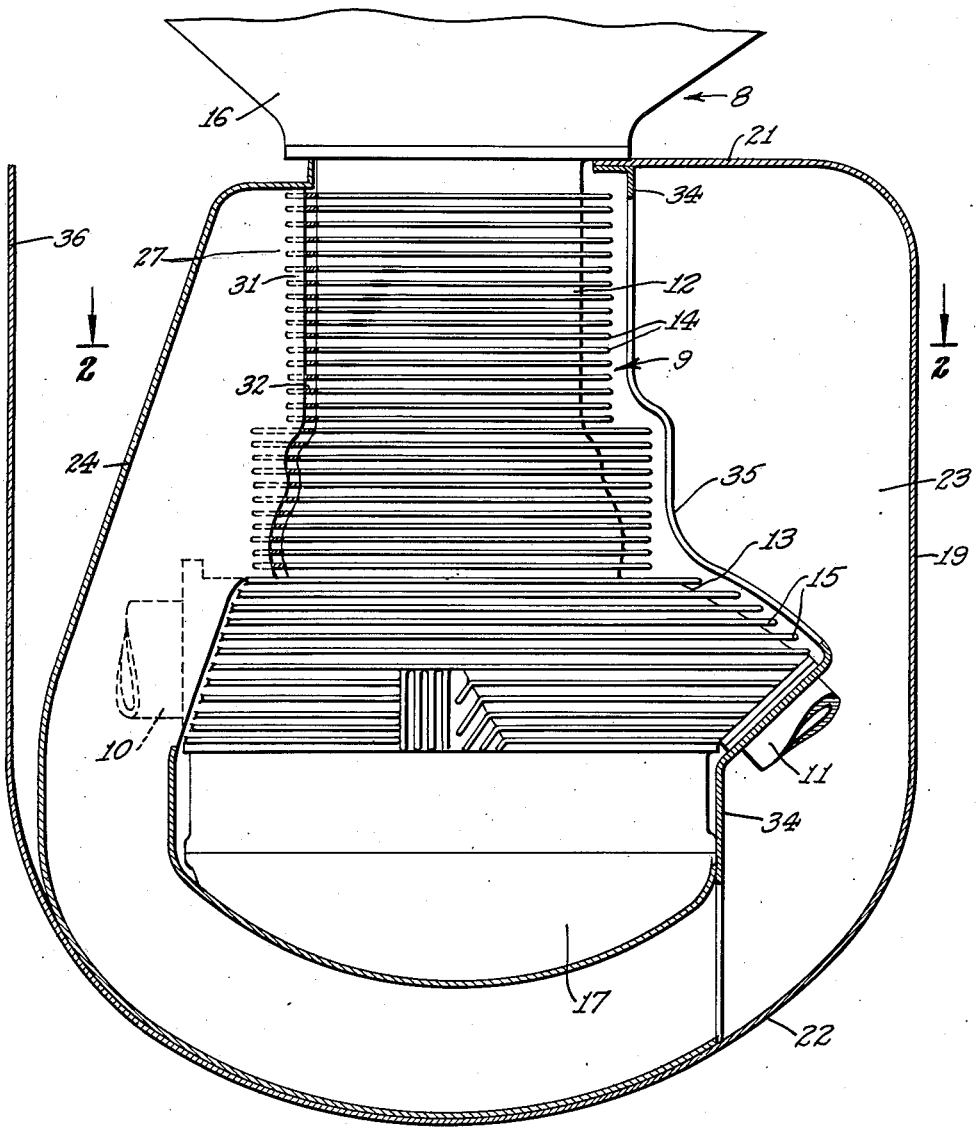
Figure 1 is a vertical section through an inverted inline aeronautical engine equipped with the local turbulence-creating cooling baffle of this invention, as seen along the line 1—1 of Fig. 2.

Referring to Figs. 1 and 2 of the drawings, numeral 8 designates an inverted inline aeronautical engine to which the invention may be adapted, and having a bank of cylinders 9, which may be six in number, provided with the usual intake and exhaust pipes 10 and 11, respectively. The barrels 12 and the heads 13 of the cylinders constituting the bank 9 are provided with the usual horizontal cooling fins 14, the head being provided with additional cooling fins 15 extending longitudinally of the cylinder bank 9 as shown. The crankcase 16 and the camshaft housing 17 are positioned above and below the cylinder bank 9 according to the usual construction of inverted inline engines. One side of the engine 8 is provided with the scoop 19 having an opening 20 directed in the direction of travel of the engine and preferably located in the slipstream of the propeller for collecting a portion of the air stream, the top 21, bottom 22, and end of the scoop 19 being sealed so as to form a substantially closed chamber into which the air flows, this chamber being designated 23 and being located at one side of the cylinder bank 9, as shown.

Extending upwardly from the bottom 22 of the scoop 19 along the lee side of the cylinder bank 9, is a series of conduits or stacks 24, one for each cylinder, as shown in Fig. 2. Each stack 24 tapers upwardly and is provided with an outlet slot 25 directed in the direction of the adjacent cylinder barrel 12, this slot 25 being defined by two flanges 26 and 27 and extending the full height of the cylinder, including the barrel 12 and head 13, and being narrow with respect to the diameter of the stack or conduit 24, i. e., the cross-sectional area of stack 24 at any horizontal plane is greater than that of the slot 25 in that plane, as seen in Fig. 2.

Flange 26 is continued around the lee side of the cylinder to form the baffle 28 having an outwardly turned lip 29, this baffle 28 preferably either being in contact with the tips of the cylinder fins 14, as shown in Fig. 2, or very close to them.

The other flange 27 is turned inwardly toward the axis of the cylinder in the general radial direction with the tip 31 extending part way through the cooling fins 14 so that its sharp edge is spaced from the outer surface of the cylinder barrel 12, thus providing a passage around its edge through which some of the cool air delivered at high pressure through the slot 25 flows to join the lower pressure cross stream flowing between the cylinders. The baffle 27, 31 thus formed constitutes the turbulence-creating baffle of this invention, in conjunction with a pressure cooling air stream, which the sharp free edge of the baffle 27, 31 partly intercepts, thus causing turbulence in the air stream at that point, as shown by the arrows in Fig. 2. This turbulent air scours the surfaces of the cylinder fins 14 and barrel surfaces, removing the spent cooling air which clings thereto and also supplying fresh cooling air with great rapidity to more effectively cool this localized area of the cylinder.

The tip 31 or edge of the baffle may be a straight edge on the flange 27 and the fins 14 may be provided with an axial saw cut 32 in which the tip or edge 31 is inserted, as shown in Figs. 1 and 2, or the tip 31 may be serrated as shown in Fig. 3, with the uncut portions or projections 33 extending between the fins 14. Obviously, the fins 14 may be saw cut only to half the depth of penetration of the tip or edge 31, and the tip or edge 31 partly serrated, if desired. Although the off-center position of the conduits 24 shown in Fig. 2 is preferred, conduits may be located at the center of the corresponding cylinders with substantially equal, and in some cases better, cooling effect, and the turbulence-creating baffle 27, 31 may be placed at any point requiring special cooling, substantially radially of the cylinder or at an angle to the cylinder radius, as shown.

A similar group of conduits 24 with turbulence-creating baffles 27, 31 may be positioned adjacent the upstream or front side of the cylinder bank 9 as disclosed in said application to secure the desired bipolar cooling, or a plate 34, having spaced vertical slots 35, with turbulence-creating edges 36, preferably located opposite the axes of the corresponding cylinders of the bank 9, may be employed as shown in Figs. 1 and 2.

As in the case of the passages 25 of conduits 24, the aggregate area of the openings 35 in the front plate 34 may be less than the air intake openings 20 of the scoop 19, or, the outflow of air may be otherwise restricted or retarded, as by making the combined areas between baffle 28 and the cylinder wall less than the area of the slot 25 leading thereto. Accordingly, a substantial static pressure builds up within the scoop chamber 23, owing to the kinetic energy of the inflowing air, so that the air issuing from slots 35, in the front baffle 34 and from slots 25 in the stacks or conduits 24 flows at substantial velocity and pressure over the adjacent areas of the cylinder, in the direction of the arrows shown in Fig. 2. Owing to the shape of the flange 27 and baffle 28, the air issuing from the slots 25 of the conduits or stacks 24 not only flows at substantial velocity over the cylinder fins 14 and surfaces of the cylinder head and barrel, but it is caused to flow between the fins around a substantial portion of the lee side of the cylinder by reason of being confined between the cylinder barrel 12 and the baffle 28 and also against the cylinder and between the fins as it flows out around the tip 31 of the flange 27. The turbulence created by the tip has a scouring effect, thus efficiently cooling the cylinder at this point.

The cooling air is thus divided bipolarly, emerging from both openings 25 and 35 at opposite sides of the cylinders, so that these hotter sides are scrubbed and cooled first by the large volume of cool air and this air then cools the other sides or intercylinder surfaces requiring less cooling. The construction of the air-intercepting baffles 27, 31 and their location with respect to the cylinders and fins is such that localized areas of the cylinder requiring special cooling will be effectively cooled as required. Furthermore, the construction of the baffles 27, 31 is such that the cooling air is constrained to flow over the entire depth of the fins so that the entire fin from root to tip is effective in rejecting heat to the cooling air.

The spent cooling air entering the lower pressure area 37 between the cowling 38 and the lee side of the cylinder bank, externally of the stacks or conduits 24, is preferably withdrawn therefrom by gills 39 or other eduction means in accordance with the usual practice, these gills 39 being located in the slipstream to create suction.

While I have disclosed my invention as applied to a multiple cylinder engine of the inline type and in a bipolar cooling system, it is to be understood that the invention may be practiced in connection with radial type engines and with one or any number of cylinders, and that I reserve the right to all changes in form and to all applications of the invention falling within the principles of this invention and the scope of the appended claims.

I claim:

1. In a bipolar cooling system for an engine comprising a row of cylinders, the combination of at least one air scoop having an intake opening for receiving air under pressure, means on each side of said cylinders in communication with said scoop and provided with restricted passages having outlets extending substantially along the lengths of said cylinders at opposite sides thereof for directing air upon selected areas thereof, the air directed against the areas of said cylinders on one side of said bank of cylinders following the surface of said cylinders and flowing as a cross stream between the cylinders to a low pressure area, and said outlets on the other side of said bank of cylinders comprising flanges having their ends terminating at the margins of said areas on said side of said cylinders and at points spaced from said cylinders.

2. In a bipolar cooling system for an engine comprising a row of cylinders, the combination of at least one air scoop having an intake opening for receiving air under pressure, means on each side of said cylinders in communication with said scoop and provided with restricted passages having outlets extending substantially along the lengths of said cylinders at opposite sides thereof for directing air upon selected areas thereof, the air directed against the areas of said cylinders on one side of said bank of cylinders following the surfaces of said cylinders and flowing as a cross stream between the cylinders to a low pressure area, and said outlets on the other side of said bank of cylinders comprising flanges having their ends terminating at the margins of said areas on said side of said cylinders and at a point spaced from said cylinders, one of said flanges extending along said cylinder to one edge of said space, and the other of said flanges terminating at a point at the other edge of said area and at a point closer to said cylinders.

3. In an internal combustion engine having at least one cylinder provided with cooling fins and transmitting a greater degree of heat at at least one point than around the remainder of the cylinder during operation of the engine, the combination of means for conducting a stream of air to said cylinder, and baffle means having a sharp edge extending substantially radially partly through said fins adjacent said point for partially intercepting said air stream to create turbulence therein at said point, whereby the turbulence created thereby in the air stream occurs immediately at and between the fins at said point.

4. In an internal combustion engine having at least one cylinder provided with cooling fins, the combination of means for conducting a stream of air to said cylinder at a point thereon tending to overheat during operation of the engine, and baffle means having a sharp edge projecting inwardly toward said fins for partially intercepting said air stream to create turbulence therein at said point, the edge of said baffle means over which the air flows being positioned between the tips and roots of said fins, whereby the turbulence created thereby in the air stream occurs immediately at and between said fins at said point.

5. In an internal combustion engine having spaced cylinders having cooling fins and adapted to be located in an air stream, the combination of an air scoop for substantially enclosing one side of said cylinders and having an opening for directing a portion of the air stream into said scoop, means cooperating with said cylinders and forming with said scoop a substantially closed chamber in which the air entering said scoop builds up a substantial pressure, said means providing restricted passages for guiding pressure air streams at relatively high velocity over the cylinder surfaces and out of said chamber, and baffle means in said chamber having relatively sharp free edges projecting toward said cylinders and partly through the fins thereof and extending into said streams flowing through said openings over said cylinder surfaces for creating turbulence in said streams.

6. In an internal combustion engine having at least one cylinder provided with spaced cooling fins and having a point which tends to overheat during operation of the engine, the combination of means for conducting a stream of cooling fluid across said fins substantially in a direction parallel thereto, and a baffle positioned transversely of said stream in a plane extending substantially through the axis of said cylinder with its free edge positioned between the roots and tips of said fins to provide a reduced fluid passage between said baffle edge and the adjacent wall of said cylinder at said point, whereby the baffle partially intercepts the flow of said cooling fluid between said fins to cause it to traverse the same from root to tip in its flow through said passage and to create turbulence therein at said point.

7. In an internal combustion engine having at least one cylinder provided with cooling fins, the combination of means for conducting a stream of air to said cylinder, and baffle means having a sharp edge extending substantially radially partly through said fins for partially intercepting said air stream, whereby a portion of said air stream flows turbulently between the fins and through the space between said sharp edge and the wall of said cylinder to increase the cooling effect of the air at that point.

8. In an internal combustion engine having at least one cylinder provided with cooling fins, the combination of means for conducting a stream of air to said cylinder, and baffle means having a sharp edge extending substantially radially partly through said fins to a predetermined depth for partially intercepting said air stream, whereby a limited air stream flows between the fins and over said sharp edge to a predetermined depth to increase the effectiveness of the fins in dissipating the heat from the cylinder.

ALFRED T. GREGORY.

REFERENCES CITED

The following references are of record in the file of this patent:

UNITED STATES PATENTS

| Number | Name | Date |
|---|---|---|
| 1,480,866 | Smith | Jan. 15, 1924 |
| 2,004,040 | Dintilhac | June 4, 1935 |
| 2,070,565 | Dintilhac | Feb. 16, 1937 |
| 2,152,043 | Gregory | Mar. 28, 1939 |
| 2,182,866 | Gabrielson | Dec. 12, 1939 |
| 2,289,959 | Gregory | July 14, 1942 |
| 2,424,416 | Piry | July 22, 1947 |

FOREIGN PATENTS

| Number | Country | Date |
|---|---|---|
| 502,864 | Great Britain | Mar. 23, 1939 |